United States Patent [19]
Kang et al.

[11] Patent Number: 5,793,562
[45] Date of Patent: Aug. 11, 1998

[54] HEAD DRUM PROTECTOR FOR MAGNETIC RECORDING AND REPRODUCING APPARATUS

[75] Inventors: Myung Goo Kang, Seoul; Seong Sik Kang; Sung Hoon Choi, both of Kyungki-Do; Mun Chea Joung, Seoul; Byoung Gyu Jang, Kyungki-Do; Kye Yeon Ryu; Hyo Chong Yu, both of Seoul; Sang Jig Lee, Kyungki-Do, all of Rep. of Korea

[73] Assignee: Goldstar Co., Ltd., Seoul, Rep. of Korea

[21] Appl. No.: 526,763

[22] Filed: Aug. 4, 1995

Related U.S. Application Data

[63] Continuation of Ser. No. 076,147, Jun. 14, 1993, abandoned.

[30] Foreign Application Priority Data

Jun. 20, 1992 [KR] Rep. of Korea ............. 10836/1992

[51] Int. Cl.⁶ ...................... G11B 5/10; G11B 15/61
[52] U.S. Cl. ........................... 360/85; 360/130.23
[58] Field of Search ................ 360/84, 85, 130.22, 360/130.24, 130.23, 130.21, 96.6, 107

[56] References Cited

U.S. PATENT DOCUMENTS

| | | |
|---|---|---|
| 3,592,976 | 7/1971 | McGinnis ................ 360/130.22 |
| 3,797,776 | 3/1974 | Umeda et al. ................ 360/85 |
| 4,366,516 | 12/1982 | Ogata et al. .............. 360/130.24 |
| 4,723,182 | 2/1988 | Nakanishi .................... 360/85 |
| 4,903,879 | 2/1990 | Noguchi et al. .......... 360/130.21 |
| 4,985,789 | 1/1991 | Kodama et al. ............... 360/85 |
| 5,291,349 | 3/1994 | Yamaguchi .................. 360/84 |
| 5,321,565 | 6/1994 | Shibaike et al. .............. 360/85 |

*Primary Examiner*—Stuart S. Levy
*Assistant Examiner*—George J. Letscher
*Attorney, Agent, or Firm*—Birch, Stewart, Kolasch & Birch, LLP

[57] ABSTRACT

A head drum protector for a magnetic recording and reproducing apparatus, such as a slide type camera recorder. The head drum protector is preferably integrated and comprises a head drum protecting wall for protecting a rotary head drum, an opening provided at the lower section of the head drum protecting wall to receive a head base of the rotary head drum and to bring the rotary head protector into engagement with the head base. A pair of support blades extend outwardly from opposite sides of the protecting wall to enlarge the head drum protecting area of the head drum protecting wall and to support an opened tape cassette door. A sensor holder is provided at the lower front of the protecting wall to hold a LED sensor used as a tape end sensor. At a lower section between the protecting wall and the support blade, a fixing part is provided in order to mount the head drum protector on the slide base of the deck mechanism.

13 Claims, 5 Drawing Sheets

1

HEAD DRUM PROTECTOR FOR MAGNETIC RECORDING AND REPRODUCING APPARATUS

This application is a continuation of application Ser. No. 08/076,147 filed on Jun. 14, 1993, now abandoned.

BACKGROUND OF THE INVENTION

1. Field of the Invention

The present invention relates to a deck mechanism of a magnetic recording and reproducing apparatus, such as a slide type camera recorder, and more particularly to a head drum protector for the magnetic recording and reproducing apparatus.

2. Description of the Prior Art

Conventionally, a deck mechanism of a magnetic recording and reproducing apparatus, such as a slide type camera recorder or camcorder, is provided at its rear section with a rotary head drum for recording and playing back a video signal and an audio signal. As is well known to those skilled in the art, the rotary head drum, an expensive element, is a high precision element and such an important element that it decisively influences the performance of the apparatus.

However in the prior art, there is no means for protecting the rotary head drum, thereby there is a risk of damage to the head drum. That is, when the tape cassette is mistakenly inserted into the cassette holder of the opened cassette housing such that the tape cassette is inserted lengthwise rather than breadthwise or when a matter damageable to the rotary head drum is inserted into the opened cassette holder, the rotary head drum comes into direct contact with the tape cassette or with the damageable matter, thereby causing damage to the rotary head drum.

For example, a person who does not know how to treat the camcorder may mistakenly insert the tape cassette into the cassette holder of the opened cassette housing such that the tape cassette is inserted lengthwise rather than breadthwise. Moreover, an inquisitive person, such as a child, often inserts matter damageable to the rotary head drum, such as a ball-point pen or a hardened material, into the opened cassette housing. In these cases, the mistakenly inserted tape cassette or the damageable matter comes into direct contact with the rotary head drum since there is no head drum protecting means, so that it causes damage to the rotary head drum which is a highly precise and expensive element. Conventionally, the damaged rotary head drum results in faulty operation of the camcorder and is difficult to repair and, in this regard, should be substituted with a new one. Thus, the known camcorder having no head drum protecting means induces consumer's discontent caused by the contact damage of the rotary head drum and deteriorates the reliability of the camcorder.

SUMMARY OF THE INVENTION

It is, therefore, an object of the present invention to provide a head drum protector for a magnetic recording and reproducing apparatus in which the aforementioned problems can be overcome and which prevents damage to the rotary head drum caused by insertion of damageable matter or a faulty insertion of the tape cassette into the opened cassette housing.

It is another object of the present invention to provide a head drum protector for a magnetic recording and reproducing apparatus which has tape cassette support means for supporting the tape cassette while opening the door of the tape cassette.

It is a further object of the present invention to provide a head drum protector for a magnetic recording and reproducing apparatus which has a sensor holder for supporting a tape end sensor.

It is yet another object of the present invention to provide a head drum protector for a magnetic recording and reproducing apparatus which is integrally formed.

To accomplish the above objects, a head drum protector for a magnetic recording and reproducing apparatus according to an embodiment of the present invention comprises a head drum protecting vertical wall adapted for protecting the rotary head drum, an opening provided at the lower section of the head drum protecting wall to receive a head drum base of the rotary head drum and to bring the protector into engagement with the head base, a pair of support blades extending from opposite sides of the protecting wall to enlarge the head drum protecting area of the protecting wall and to support the tape cassette, a sensor holder provided at the lower front of the protecting blade and mounting a light emitting diode sensor thereon, and a fixing part arranged at a lower section between the protecting wall and each of the support blades to mount the head drum protector on a slide base of a deck mechanism of the apparatus. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
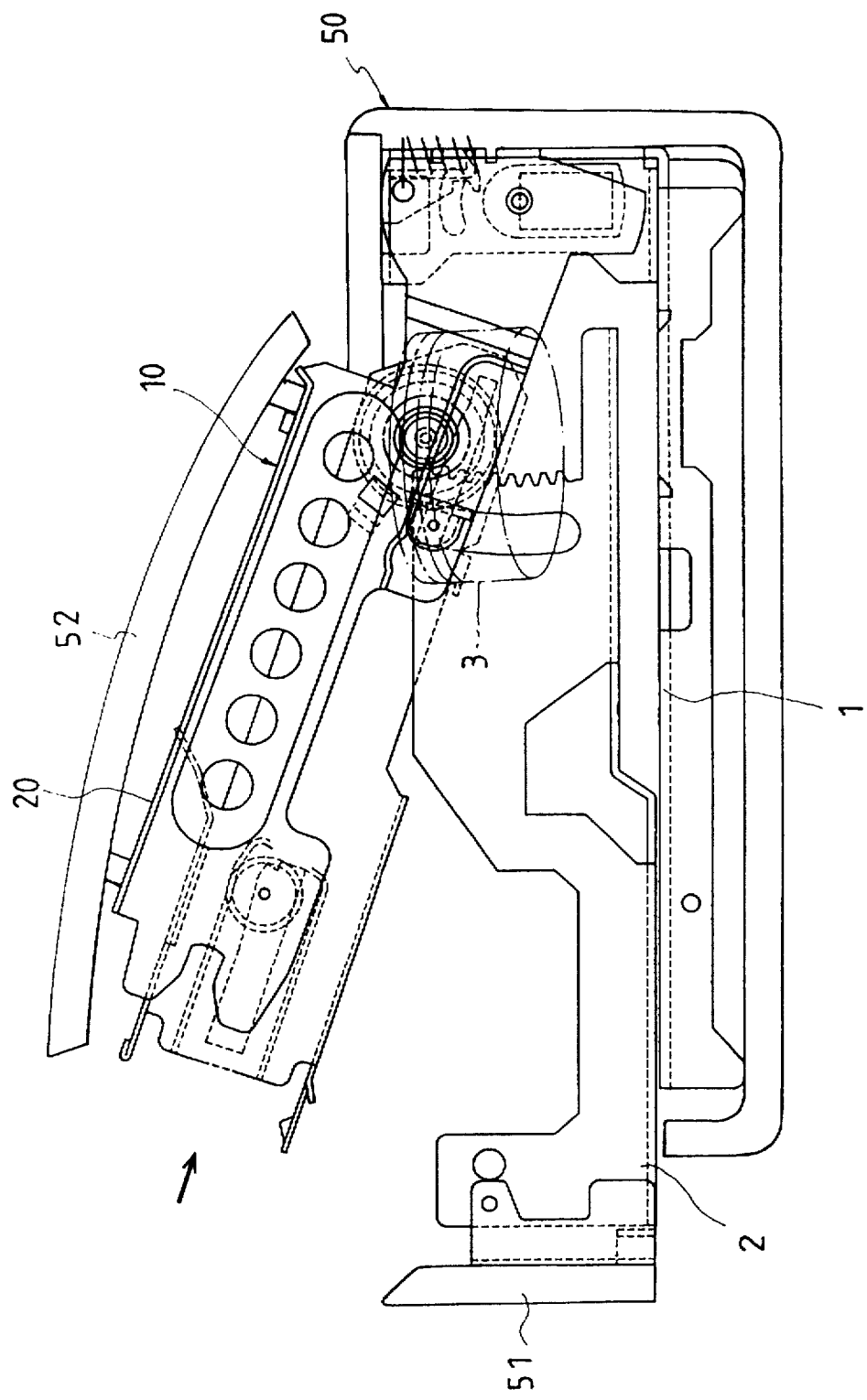
FIG. 1 is a side view of a deck mechanism in accordance with the present invention showing an opened cassette housing.
Figure 2:
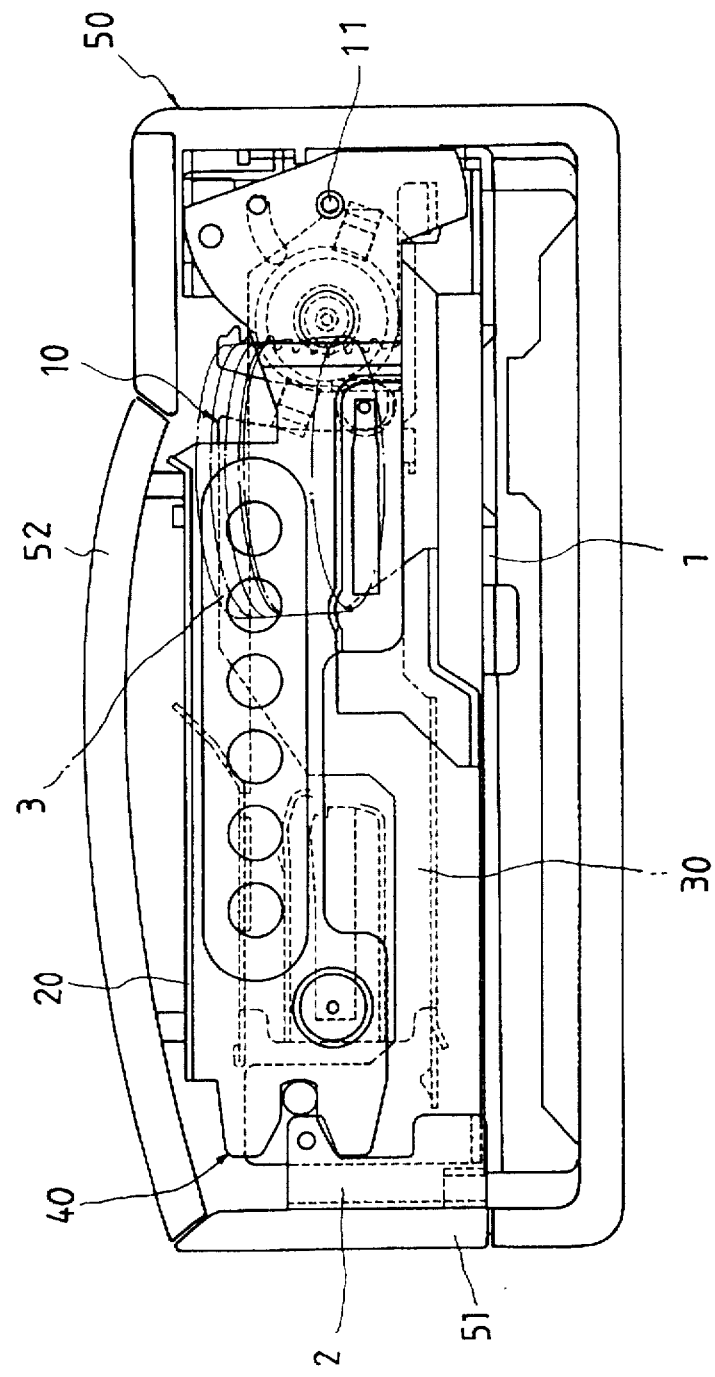
FIG. 2 is a side view of the deck mechanism of the present invention showing a closed cassette housing.
Figure 3:
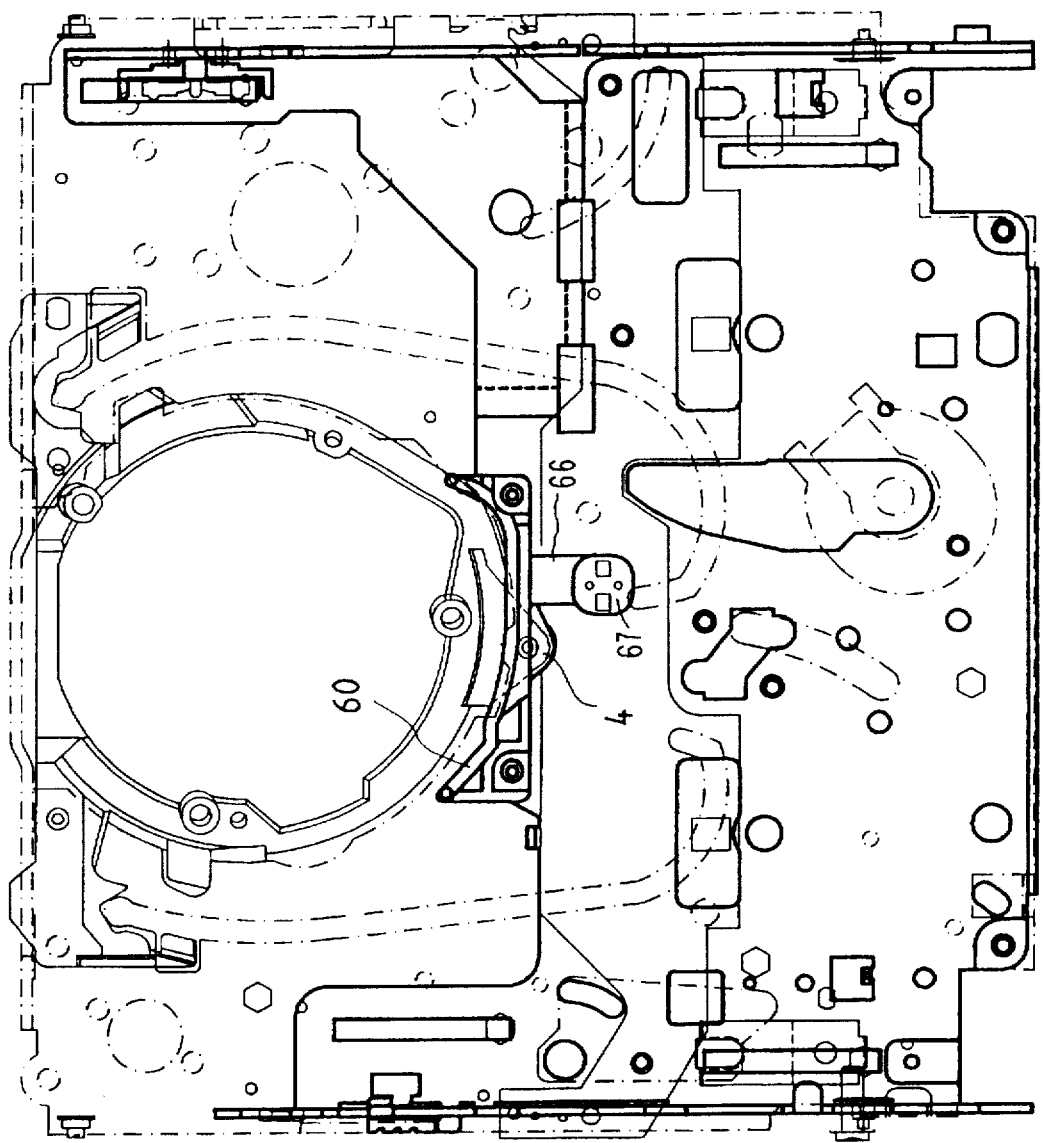
FIG. 3 is a plan view of the deck mechanism of the present invention showing a head drum protector engaging with a head drum base.
Figure 4:
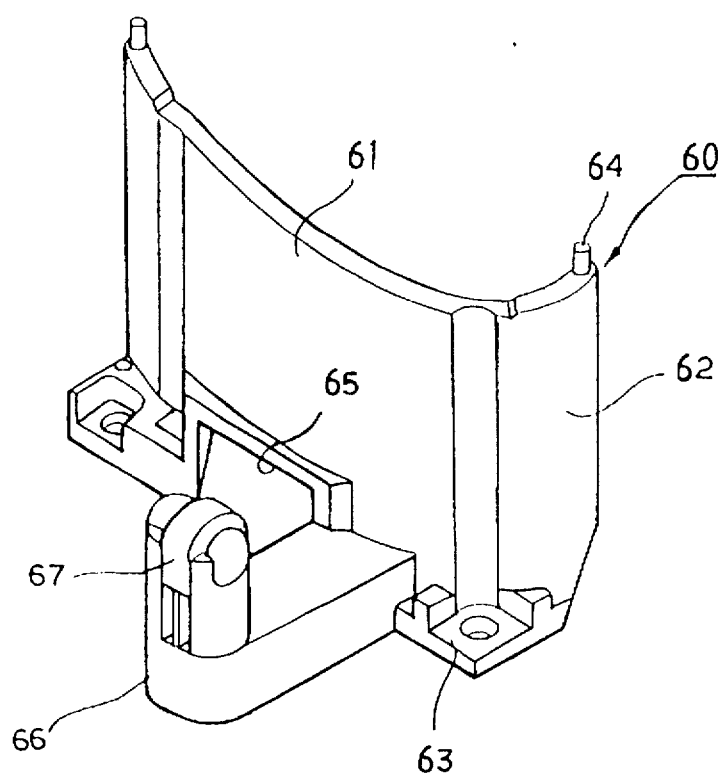
FIG. 4 is a view of head drum protector in accordance with a preferred embodiment of the present invention.

With reference to the accompanying drawings, FIGS. 1 and 2 show a deck mechanism of a magnetic recording and reproducing apparatus having a rotary head drum protector in accordance with the present invention. FIG. 3 shows the head drum protector of the present invention engaging with a head drum base, and FIG. 4 shows in a perspective view of a head drum protector in accordance with a preferred embodiment of the present invention.

As shown in FIGS. 1 and 2, the deck mechanism includes a slide base 2 which is movably mounted on a stationary base plate 1, having a rotary head drum 3 at its rear section. The slide base 2 is linearly reciprocated frontwards and backwards with respect to the stationary base plate 1. The deck mechanism further includes a turnable cassette housing 10 which is hinged to the rear end of the stationary base plate 1 such that it is turned about a hinge pin 11 provided at the hinged connection between the base plate 1 and the cassette housing 10.

The head drum base 4 is mounted on the fixed base 1 and the head drum 3 is mounted on the head drum base 4. The head drum 3 includes a fixed lower drum and a rotatable upper drum and the lower drum is fixed to the head drum base 4.

The turnable cassette housing 10 comprises a turnable bracket 20 which is hinged to the rear end of the stationary base plate 1 by the hinge shaft 11, and a cassette holder 30 which is provided in the turnable bracket 20 and reciprocates along with the slide base 2 under the condition that the cassette housing 10 is closed. In addition, a cassette cover 52 is mounted on the cassette housing 10 such that it is turned along with the cassette housing 10.

The deck mechanism 40 is provided in a main casing 50 of the magnetic recording and reproducing apparatus, such as a camcorder. A slide cover 51 is mounted on the front end of the slide base 2 such that it moves along with the slide base 2.

In operation, a tape cassette is inserted into the opened cassette housing 10 in a direction shown at the arrow of FIG. 1 prior to pressing down of the cassette housing 10. Upon pressing down the cassette housing 10, the housing 10 is locked to the stationary base plate 1 as a result of locking of a lock lever (not shown) of the cassette housing 10 to a lock pin (not shown) of the stationary base plate 1. At the same time of the locking operation, the slide base 2 together with the cassette holder 30 loaded with the tape cassette advances toward the rotary head drum 3 by the rotational force of a loading motor (not shown). When the slide base 2 reaches a cassette loading position just before the rotary head drum 3, a variety of modes of the camcorder, such as a playback mode, a rewind mode and a fast forward mode, can be performed.

Turning to FIG. 3, the head drum protector 60 is mounted on the rear end of the slide base 2 such that it moves along with the slide base 2 with respect to the rotary head drum 3. Thus, the head drum protector 60 protects the rotary head drum 3 from being damaged when the tape cassette is mistakenly inserted into the cassette holder 30, not shown in FIG. 3, of the opened cassette housing 10 such that the tape cassette is inserted lengthwise rather than breadthwise, or when damageable matter is inserted into the cassette holder 30 in the direction as shown at the arrow of FIG. 1.

As shown in FIG. 4, the head drum protector 60 is integrally formed. The integrally formed head drum protector 60 is preferably made of a synthetic resin and comprises a head drum protecting vertical wall 61 adapted for protecting the rotary head drum 3 by preventing damageable matter from contacting with the head drum surface. A pair of support blades 62 extend backwardly from opposite sides of the protecting wall 61 to enlarge the head drum protecting area of the protecting wall 61. Each of the support blades 62 is provided at its top with at least one protrusion 64 for supporting a cassette door of the tape cassette while opening the cassette door. The protecting wall 61 is integrally formed with a pair of fixing parts 63 each of which is provided at the lower section between the protecting wall 61 and each of the support blades 62. The head drum protector 60 is mounted on the slide base 2 through the fixing parts 63. At the lower section of the protecting wall 61, an opening 65 is provided to receive a head drum base 4 of the rotary head drum 3 and to bring the protector 60 into engagement with the head drum base 4 when the slide base 2 along with the cassette housing 10 reaches the tape cassette loading position. The head drum protector 60 further includes a sensor holder 66 which is integrally formed with the protecting blade 61 at the lower front of the blade 61 and on which a light emitting diode sensor 67 is mounted.

Figure 5:
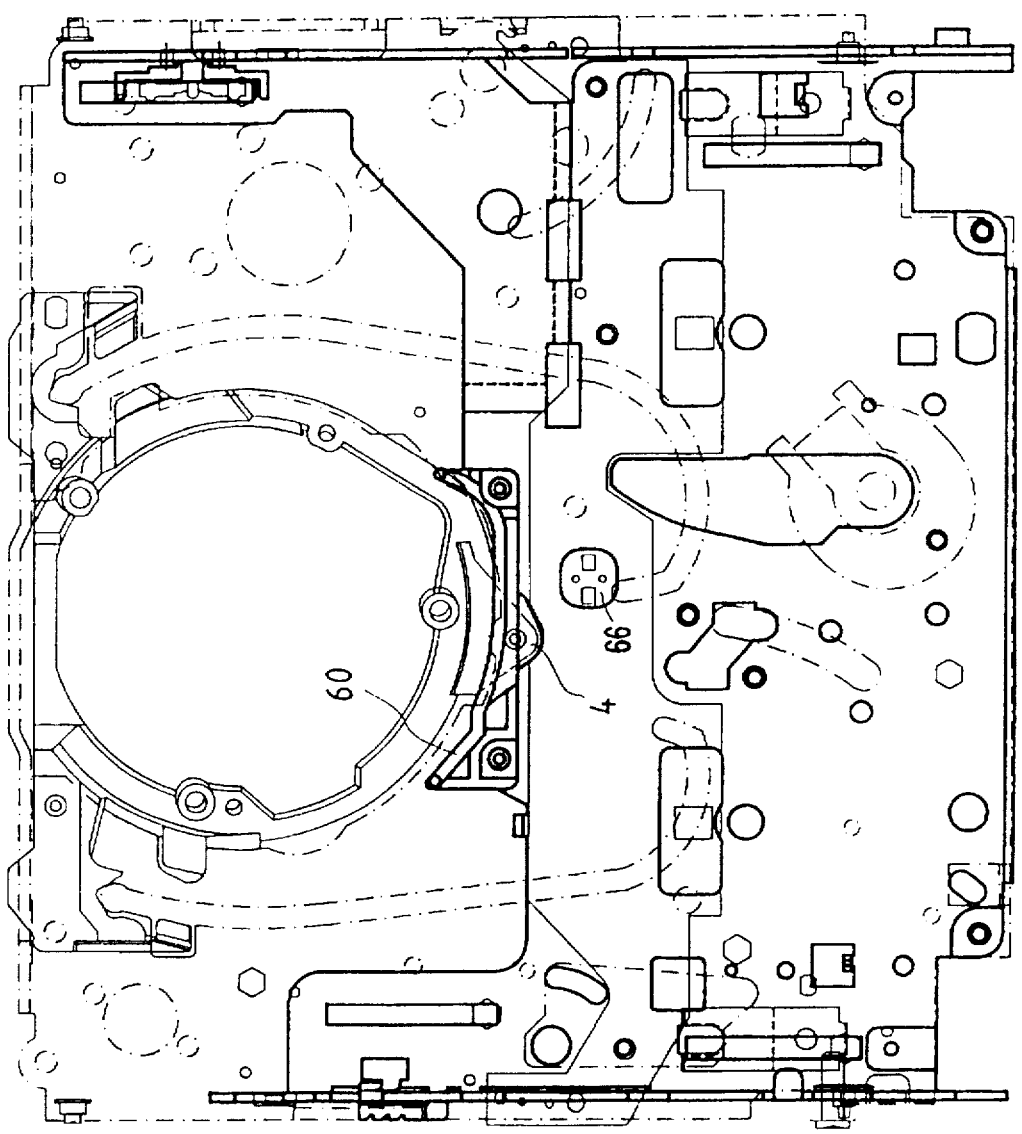
FIG. 5 is a plan view of the deck mechanism of the present invention showing a separately provided sensor holder.

As shown in FIG. 4, it is preferred to construct the head drum protecting wall 61 such that the protecting wall 61 has a desired shape, including an arcuate shape covering the front section of the head drum 3, suitable for covering the head drum surface as much as possible. The support blades 62 are provided at opposite sides of the protecting wall 61, so that they enlarge the head drum protecting area of the protecting wall 61. At the top of each of the support blades 62, at least one protrusion 64 for supporting the cassette door is provided. The head drum protector 60 is mounted on the slide base 2 by the fixing parts 63 through each of which a set screw (not shown) screws the head drum protector 60 to the slide base 2. However, the head drum protector 60 may be tightly screwed to the slide base 2 by a plurality of set screws screwed through an arm-shaped fixing member other than the fixing parts 63. The light emitting diode (LED) sensor 67 used as a tape end sensor is mounted on the sensor holder 66 of the protector 60 and senses that the tape cassette is to be ejected since there is no tape to be additionally taken out of the tape cassette. In FIG. 4, the sensor holder 66 is integrally formed with the protecting wall 61 of the head drum protector 60, however, it should be understood that the sensor holder may be separately constructed without affecting the functioning of this invention. A separately constructed sensor holder is shown in FIG. 5. The head drum protector 60 includes the opening 65 provided at the lower section of the protecting wall 61. This opening 65 receives the head drum base 4 of the rotary head drum 3 when the slide base 2 along with the cassette housing 10 reaches the tape cassette loading position, thereby bringing the protector 60 into engagement with the head drum base 4. The opening 65 also facilitates the reaching of the head drum protector 60 to the rotary head drum 3 and achieves the desired head drum protection by the protector 60.

In accordance with the head drum protector 60 of this invention, the rotary head drum 3 is protected from being damaged when the tape cassette is mistakenly inserted into the cassette holder 30 of the opened cassette housing 10 such that the tape cassette is inserted lengthwise rather than breadthwise, or when damageable matter is inserted into the cassette holder 30 in the direction as shown at the arrow of FIG. 1. In addition, even when the cassette housing 10 is closed as shown in FIG. 2 while receiving damageable matter, the rotary head drum 3 is prevented from contact with the damageable matter since the head drum protector 60 isolates the head drum 3 from the damageable matter.

In operation a tape cassette is inserted into a cassette holder (30) and then the cassette cover (52) is moved in a closed position, a slide base (2) fixed with a drum protector (60) moves toward a head drum (3) by means of a separate driving source. At this moment, a door of the tape cassette is pushed to be opened by a lever (not shown, but located within the deck) so that the door is supported by the protrusion (64) provided at an upper portion of the drum protector (60). In this state, the tape is located between the head drum (3) and the drum protector (60) so that the tape may be loaded around the head drum (3) by a guide post (not shown).

The head drum protector 60 is preferably made of a synthetic resin, however, it may be made of materials, such as a metal plate, other than the synthetic resin without affecting the functioning of this invention. In addition, the head drum protector of the present invention may be integrally formed with the slide base by forming the slide base to have the head drum protector and, thereafter, bending the protector to be elected. Also, the sensor holder supporting the LED sensor 67 may be formed integrally with or separately from the protecting wall 61 without affecting the functioning of this invention. Moreover, the head drum protector 60 may be screwed to the slide base 2 using the pair of fixing parts 63 shown in FIG. 4 or may be tightly screwed to the slide base 2 by the plurality of set screws screwing through the arm-shaped fixing member.

Also, the head drum protector 60 of this invention may be constructed to be a stationary type by mounting the protector 60 on the stationary base plate 1 rather than the movable slide base 2.

As described above, the head drum protector of the present invention protects the rotary head drum from contact with damageable matter mistakenly inserted into the cassette housing, thereby preventing damage to the rotary head drum and increasing the reliability of the magnetic recording and reproducing apparatus. Also, the protector is integrally formed such that it reduces the number of elements of the head drum protector, thereby simplifying the engagement of the head drum protector with the deck mechanism, resulting in improvement of the assembly ability as well as the strength of the head drum protector. Thus, the head drum protector of this invention reduces the manufacturing cost and achieves the recent trend of compactness of the apparatus.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A magnetic recording and reproducing apparatus comprising:

a stationary base plate having a rotary head drum mounted thereon;

a slide base, slidably mounted on said stationary base plate, for linearly moving to a forward position away from said rotary head drum and to a backward position toward said rotary head drum; and a head drum protector having a front and a rear side fixedly mounted on said slide base in such a manner that a tape of a tape cassette is positioned on a rear side of said head drum protector between said head drum protector and said rotary head drum in a loading mode, wherein said head drum protector includes:

a rotary head drum protecting wall;

an opening provided at a lower section of said head drum protecting wall to receive a head base of said rotary head drum and to brine said head drum protector into engagement with said head base;

enlarging and supporting means for enlarging the head drum protecting area of said head drum protecting wall and supporting a tape cassette door while opening said cassette door; and a sensor holder integrally provided at the front of said head drum protecting wall to hold a tape end sensor, wherein said enlarging and supporting means comprises a pair of support blades extending from opposite sides of said protecting wall to enlarge said head drum protecting area, each of said support blades being provided at its top with at least one protrusion for supporting said tape cassette door while opening said tape cassette door.

2. A magnetic recording and reproducing apparatus comprising:

a stationary base plate having a rotary head drum mounted thereon;

a slide base, slidably mounted on said stationary base plate, for linearly moving to a forward position away from said rotary head drum and to a backward position toward said rotary head drum; and a head drum protector having a front and a rear side fixedly mounted on said slide base in such a manner that a tape of a tape cassette is positioned on a rear side of said head drum protector between said head drum protector and said rotary head drum in a loading mode, wherein said head drum protector includes:

a rotary head drum protecting wall;

an opening provided at a lower section of said head drum protecting wall to receive a head base of said rotary head drum and to bring said head drum protector into engagement with said head base;

enlarging means for enlarging the head drum protecting area of said head drum protecting wall;

supporting means having a top with at least one protrusion for supporting a tape cassette door while opening said tape cassette door; and a sensor holder integrally provided at the front of said head drum protecting wall to hold a tape end sensor.

3. The magnetic recording and reproducing apparatus according to claim 2, further comprising means for mounting said head drum protector on said slide base of said apparatus, said mounting means being provided at a side of said enlarging means and said supporting means.

4. The magnetic recording and reproducing apparatus according to claim 2, wherein said head drum protecting wall has an arcuate shape suitable for covering the front of said rotary head drum.

5. The magnetic recording and reproducing apparatus according to claim 2, wherein said head drum protector is mounted on the rear end of said slide base of said apparatus.

6. The magnetic recording and reproducing apparatus according to claim 2, wherein said head drum protector is fixed substantially perpendicular to said slide base.

7. A magnetic recording and reproducing apparatus, comprising:

a stationary base plate having a rotary head drum mounted thereon;

a slide base, slidably mounted on said stationary base plate, for linearly moving to a forward position away from said rotary head drum and to a backward position toward said rotary head drum; and a head drum protector, having a front and a rear side, fixedly mounted on a rear end of said slide base for protecting said head drum from being contacted with a tape cassette or any other item inserted in the magnetic recording and reproducing apparatus in a direction toward said front side of said head drum protector, said head drum protector including:

a rotary head drum protecting wall;

means for supporting a tape cassette door; and a sensor holder provided on the front side of said head drum protector, wherein said head drum protector includes:

enlarging and supporting means for enlarging the head drum protecting area of said head drum protecting wall and supporting a tape cassette door while opening said cassette door, wherein said enlarging and supporting means comprises a pair of support blades extending from opposite sides of said protecting wall to enlarge said head drum protecting area, each of said support blades being provided at its top with at least one protrusion for supporting said tape cassette door while opening said tape cassette door.

8. The magnetic recording and reproducing apparatus according to claim 7, wherein said head drum protector is fixed substantially perpendicular to said slide base.

9. A magnetic recording and reproducing apparatus comprising:

a stationary base plate having a rotary head drum mounted thereon;

a slide base, slidably mounted on said stationary base plate, for linearly moving to a forward position away from said rotary head drum and to a backward position toward said rotary head drum; and a head drum protector fixedly mounted on a rear end of said slide base for protecting said head drum from being contacted with a tape cassette or any other item inserted in the magnetic recording and reproducing apparatus, said head drum protector including:

a rotary head drum protecting wall for covering a front portion of a rotary head drum; and enlarging and supporting means for enlarging the head drum protecting area of said head drum protecting wall and supporting a tape cassette door, wherein said enlarging and supporting means comprises a pair of support blades extending from opposite sides of said protecting wall to enlarge said head drum protecting area, each of said support blades being provided at its top with at least one protrusion for supporting said tape cassette door while opening said tape cassette door.

10. The magnetic recording and reproducing apparatus according to claim 9, wherein said head drum protector is fixed substantially perpendicular to said slide base.

11. A magnetic recording and reproducing apparatus comprising:

a stationary base plate provided with a head drum base of a rotary head drum;

a slide base, slidably mounted on said stationary base plate, for linearly moving to a forward position away from said rotary head drum and to a backward position toward said rotary head drum; and a head drum protector fixedly mounted on a rear end of said slide base for protecting said head drum from being contacted with a tape cassette or any other item inserted in said magnetic recording and reproducing apparatus, said head drum protector including:

a rotary head drum protecting wall;

an opening provided at a lower part of said head drum protecting wall to receive said head drum base; and means for supporting a tape cassette door, wherein said supporting means comprises a pair of support blades extending from opposite sides of said protecting wall, each of said support blades being provided at its top with at least one protrusion for supporting said tape cassette door while opening said tape cassette door.

12. The magnetic recording and reproducing apparatus according to claim 11, wherein said head drum protector is fixed substantially perpendicular to said slide base.

13. A magnetic recording and reproducing apparatus comprising:

a stationary base plate having a rotary head drum mounted thereon;

a slide base, slidably mounted on said stationary base plate, for linearly moving to a forward position away from said rotary head drum and to a backward position toward said rotary head drum; and a head drum protector having a front and a rear side fixedly mounted on said slide base in such a manner that a tape of a tape cassette is positioned on a rear side of said head drum protector between said head drum protector and said rotary head drum in a loading mode, wherein said head drum protector includes:

enlarging and supporting means for enlarging the head drum protecting area of said head drum protecting wall and supporting a tape cassette door while opening said cassette door;

wherein said enlarging and supporting means comprises a pair of support blades extending from opposite sides of said protecting wall to enlarge said head drum protecting area, each of said support blades being provided at its top with at least one protrusion for supporting said tape cassette door while opening said tape cassette door.

* * * * *